United States Patent [19]
Hikita et al.

[11] Patent Number: 5,268,974
[45] Date of Patent: Dec. 7, 1993

[54] OPTICAL SWITCH WITH PIEZOELECTRIC BIMORPH

[75] Inventors: Kazuyasu Hikita; Hiroyuki Iizuka; Yoshiaki Tanaka, all of Saitama, Japan

[73] Assignee: Mitsubishi Materials Corporation, Tokyo, Japan

[21] Appl. No.: 848,111

[22] Filed: Mar. 9, 1992

[30] Foreign Application Priority Data

Mar. 7, 1991 [JP] Japan .................................. 3-041895

[51] Int. Cl.⁵ .................................................. G02B 6/26
[52] U.S. Cl. ................................... 385/19; 385/15; 385/18
[58] Field of Search ............................... 385/15, 18, 19

[56] References Cited

U.S. PATENT DOCUMENTS 4,844,577 7/1989 Ninnis et al. ...................... 385/19 X
5,133,030 7/1992 Lee ................................. 385/15 X Primary Examiner—Rodney B. Bovernick
Assistant Examiner—Stephen W. Barns
Attorney, Agent, or Firm—McAulay Fisher Nissen Goldberg & Kiel

[57] ABSTRACT

An optical switch for use as a shutter for intercepting or passing light signals, such as beam lights, including a piezoelectric actuator attached at one end thereof to a base plate and at its other end to an optical shielding object for intercepting or passing over light beams, a mirror installed on a location close to the place where the piezoelectric actuator is attached to the base plate to reflect passed light beams, and the piezoelectric actuator being coupled to a source of energy. The light signals are intercepted or passed by the movement of the object due to modifications of the piezoelectric actuator, and the passed light signals are reflected by the mirror and detected by an optical detector.

20 Claims, 3 Drawing Sheets

OPTICAL SWITCH WITH PIEZOELECTRIC BIMORPH

BACKGROUND OF THE INVENTION

I. Field of the Invention

This invention relates to an optical switch.

More particularly, this invention is concerned with an optical switch which is mainly used as a shutter for intercepting or passing light signals and is characterized by having a small size and a light weight, and comprises a shutter operated by a piezoelectric actuator and a mirror for changing transmission directions of light signals.

II. Description of the Prior Art

Shutters for intercepting or passing light signals are typically classified into two types, i. e., mechanical shutters and non-mechanical shutters.

The mechanical shutters are operated by mechanical methods, such as rotating mirrors, lenses or prisms in the shutters or changing the connection point between fiber optic cables therein.

The non-mechanical shutters are operated by non-mechanical methods, such as by utilizing an acousticoptical effect or an electrooptical effect.

The heretofore known mechanical shutters are not suitable as they are quite cumbersome in that they are heavy and they require a large quantity of electric power, because motors are used in their driving systems to rotate or move the optical elements thereof. For example, a motor is used for rotating a polygon mirror which mirror is used to intercept the light signals, and further, preventative measures must be taken to take into consideration vibratory and electromagnetic noises of the motors.

On the other hand, the aforementioned non-mechanical shutters also have problems. The non-mechanical shutters which are operated by utilizing an electrooptical effect of PLZT (lanthanum doped lead zirconate-lead titanate), etc. are unsuitable or defective for our purposes in that the intensity of output light signals passed through the shutters is very much lower than that of input light signals to the shutters because polarizers and optical detectors used in the shutters absorb the input light signals.

Shutters which are operated by utilizing liquid crystals are also unsuitable or defective for our purposes in that S/N (signal to noise) ratios thereof become lower because the liquid crystals absorb incident light signals, and further the liquid crystals may be damaged by intensive light signals.

Shutters operated by utilizing CCD (charge-coupled device or electrocharge combination device) are also defective or unsuitable for our purposes in that light signals can not directly pass through the shutters because the light signals are converted to electric signals in the shutters.

SUMMARY OF THE INVENTION

An object of this invention is to provide an optical switch which is free of the problems of the above described conventional shutters and to provide an optical switch which is mainly used as a shutter for intercepting or passing light signals and is characterized by having a small size and a light weight and comprising a shutter operated by a piezoelectric actuator and a mirror for changing transmission directions of light signals.

An optical switch in accordance with this invention comprises a piezoelectric actuator having two ends, one of the two ends is attached to a base plate, and attached to the other end of the piezoelectric actuator is an object for intercepting or passing over light beams, a mirror is installed at a location close to the place or the one end where the piezoelectric actuator is attached to the base plate to reflect passed light beams, and means for applying a voltage to the piezoelectric actuator.

This inventive optical switch both intercepts or passes light signals, such as light beams, in response to switch-on or switch-off condition as explained hereinafter.

When a voltage is not applied to the piezoelectric actuator, i.e., in a switch-off condition of the piezoelectric actuator, light beams which emerge from an optical source located on a side opposite to the side of the base plate are intercepted by the object attached to the other end of the piezoelectric actuator and are not transmitted.

When the voltages are applied to the piezoelectric actuator, i.e., in its switch-on condition, the object attached to the other end of the piezoelectric actuator is moved downwardly to a location which permits the light beams to pass over the object by a modification of the other end of the piezoelectric actuator. When the light beams can pass over the object, they impinge onto the mirror installed on the base plate or on the piezoelectric actuator, and then the impinged light beams are reflected by the mirror surface and are directed to the optical detector, which is orthogonally related to the laser source and the piezoelectric element, and then the light beams are detected by the optical detector which is located at a position so that it can detect the impinged light beams.

The piezoelectric actuator used in this invention includes bimorph type piezoelectric actuators, unimorph type piezoelectric actuators and multimorph type piezoelectric actuators.

The material used for the element which is to intercept the light beams in this invention includes all materials which have the capacity to intercept light beams and have no influence on the modification of the piezoelectric actuator.

BRIEF DESCRIPTION OF THE DRAWINGS

Various other objects and purposes of the invention will become evident from the following detailed description taken in connection with the accompanying drawings.

DESCRIPTION OF THE PREFERRED EMBODIMENT

Figure 1:
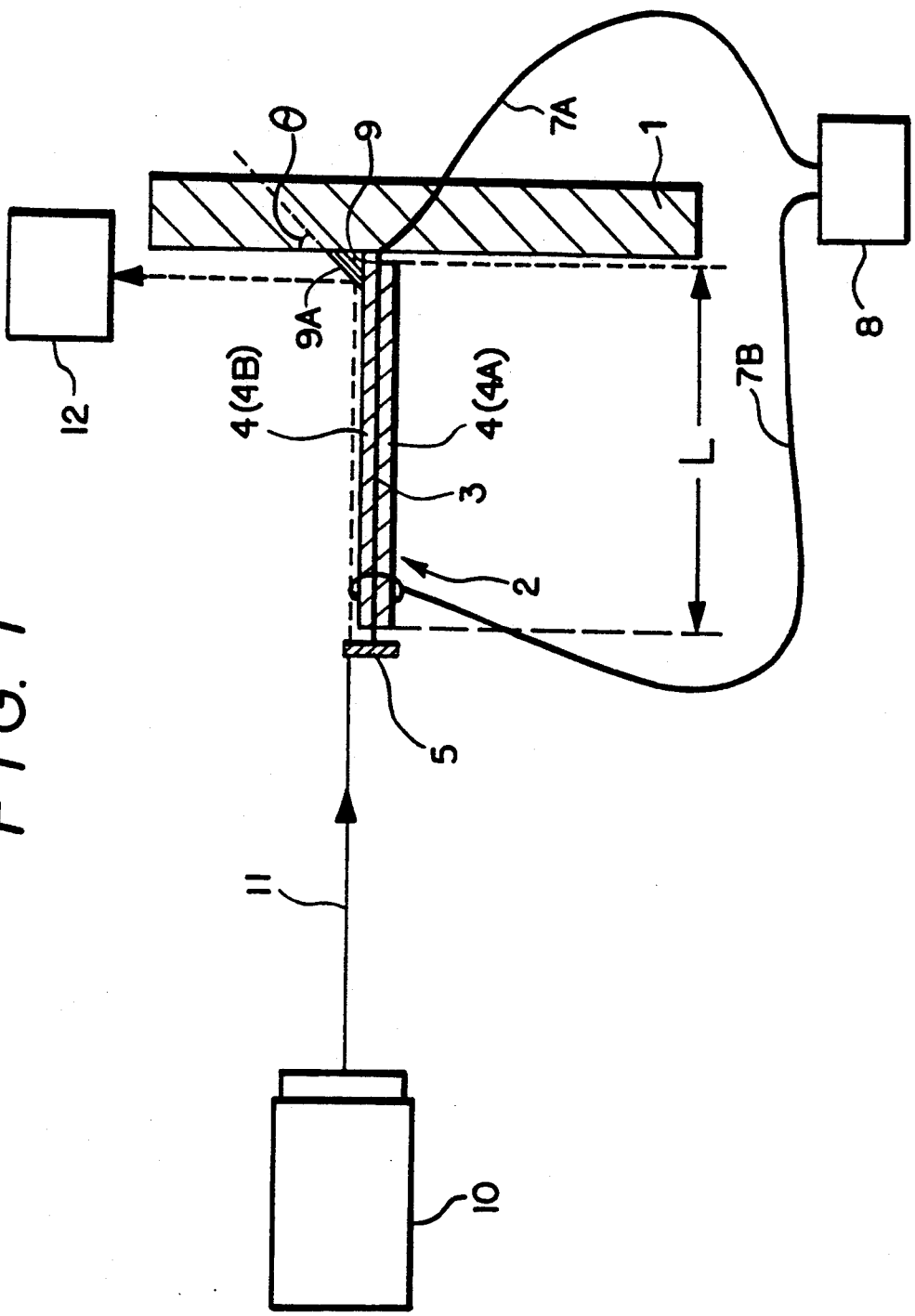
FIG. 1 is a schematic sectional view of the optical switch in accordance with this invention illustrating one embodiment using a bimorph type piezoelectric actuator.

Referring now more particularly to FIG. 1, which shows a schematic sectional view of the embodiment of the optical switch in accordance with this invention using a bimorph.

In this embodiment, the bimorph type piezoelectric actuator 2 comprises a shim plate 3 sandwiched between two piezoelectric elements 4A and 4B which are placed on opposite sides of the shim plate 3, for use as the piezoelectric actuator of this invention.

The piezoelectric elements 4A and 4B are respectively adhered to the upper and lower surfaces of the shim plate 3. The condition is such that the direction of the spontaneous polarization of each piezoelectric element points in a downward direction.

One end of the piezoelectric actuator at shim plate 3 is connected with brass base plate 1, and the other end of the shim plate 3 is connected with optical shield 5. The optical shield may also be connected with the piezoelectric elements 4A and 4B.

Therefore, when voltages are applied to the bimorph type piezoelectric actuator 2, the pointed end of the bimorph type piezoelectric actuator 2 is modified so that it moves downwardly in a direction towards the bottom of FIG. 1 by the shrinkage or shortening of the length dimension L of the piezoelectric element 4A and the extension or increase in the length dimension of the piezoelectric element 4B. This results in a movement from the FIG. 2 to the FIG. 3 position with the piezoelectric ends at shield 5 pointing downwardly as best seen in FIG. 3.

The one end of the shim plate 3 is soldered to the brass base plate 1 so as to perpendicular to brass base plate 1.

Figure 2:
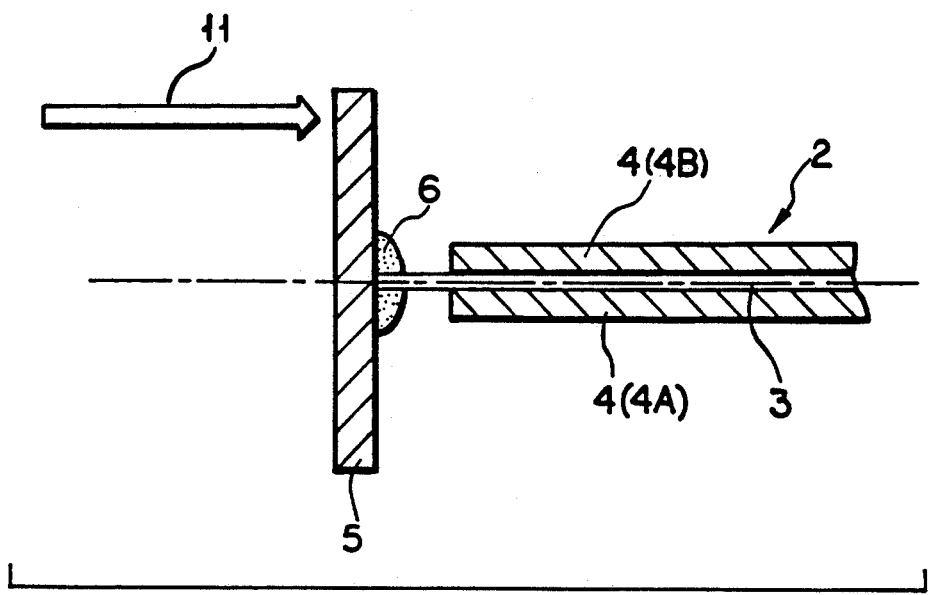
FIG. 2 is an enlarged partially sectional view depicting an off-condition of the optical switch shown in FIG. 1.
Figure 3:
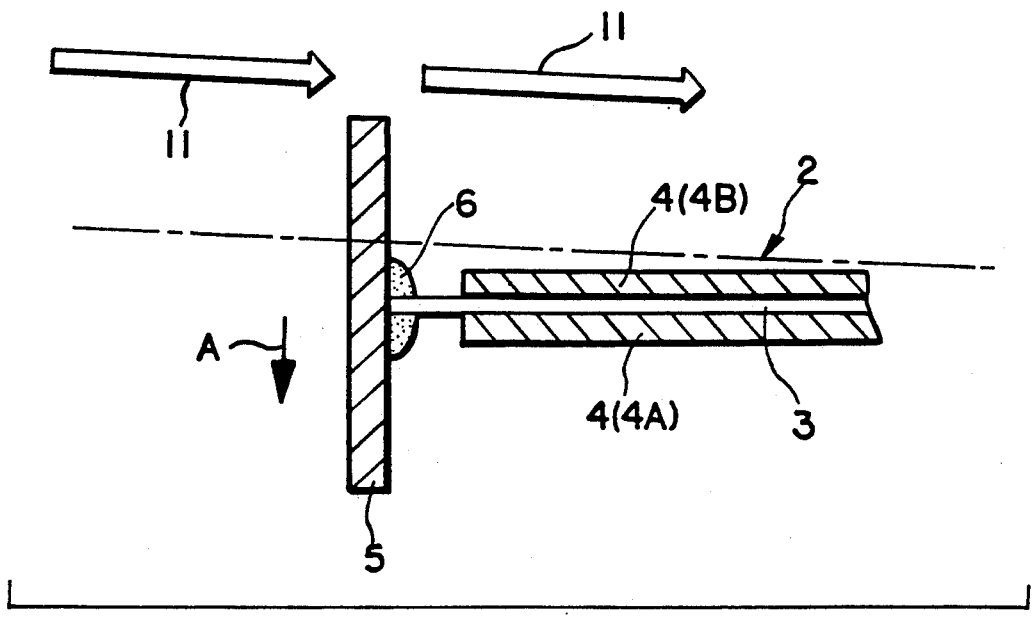
FIG. 3 is an enlarged partially sectional view depicting an on-condition of the optical switch shown in FIG. 1.

The other end of the shim plate 3 is adhered to a central position of aluminum plate 5 by an epoxy resin adhesive agent 6, see FIGS. 2 and 3. Aluminum plate 5 forms the optical shield which has the capacity to intercept light beams.

Shim plate 3 at its one and thereof is electrically connected to a DC power source 8 through a lead wire 7A so that it becomes the ground for the DC power source, and the individual piezoelectric elements 4A and 4B are electrically connected to DC power source 8 through lead wire 7B so that their upper surfaces become positive sides electrically.

A mirror 9 is attached at a location on the brass base plate 1 to reflect a light beam 11 which emerges from a He-Ne laser source 10 and passes over optical shield 5 toward optical detector 12 when the optical switch is in its switch-off condition.

The location where the mirror is attached to brass base plate 1 is close to the place where the one end of the shim plate 3 is soldered to the brass base plate 1. Mirror 9 has a mirror surface 9A which has a slope of 45°, or an angle of 45°, to the brass base plate 1.

When voltages are not applied to the optical switch by the power source 8, i.e., when the switch is in its switch-off conditions, the light beam 11 is intercepted by the upper part of aluminum plate 5, as shown in FIG. 2.

When a voltage is applied to the optical switch, i.e., in a switch-on condition, the aluminum plate 5 attached to the other end of the shim plate 3 of the piezoelectric actuator 2 is moved downwardly to a location such that the light beam 11 can pass over the upper edge thereof along the direction, shown by arrow A, and then the light beam can pass over the aluminum plate 5 and impinges onto the mirror 9 and is reflected by the mirror surface 9A in a direction orthogonal to the original direction of light beam 11, transmitted from laser source 10, and further is detected by the optical detector 12, as shown in FIG. 3.

In this embodiment, a mirror having an angle of less than 45° may be used to obtain a smaller reflection angle of the light beam.

The mirror 12 may also be installed onto the bimorph type piezoelectric actuator, but, in this case, it is thoroughly considered that the angle of the mirror may be changed by a modification of the bimorph type piezoelectric actuator 2.

Since the amount of modification of the pointed end of the bimorph type piezoelectric actuator 2 is in proportion to the length thereof, by using a bimorph type piezoelectric actuator having a longer length L, a larger diameter beam light can be controlled at lower voltages, and in a similar manner, a bimorph type piezoelectric actuator having a shorter length may be used for a smaller diameter light beam.

When the light beam passes over the aluminum plate 5, it is then passed to the mirror surface 9A and is reflected by the mirror surface 9A and is detected by the optical detector 12.

On the other hand, the light beam can not pass over the aluminum plate 5, when the DC voltage is not applied to the optical switch.

TEST 1

A bimorph type of piezoelectric actuator 2 having the piezoelectric element 4 of a length approximately equal to 30 mm in length is used in this test.

The one end of the shim plate 3 of the bimorph type piezoelectric actuator 2 is soldered to the brass base plate 1, and is perpendicular to the brass base plate 1.

When a DC voltage of 200 volts is applied to this bimorph type piezoelectric actuator 2 by DC power source 8, the other end of shim plate 3 having aluminum plate 5 adhered thereto is pulled down to a position of 600 to 700 $\mu$m lower than the original location along the direction of the arrow A in FIG. 3 due to the shrinkage of the element 4A and the extension of the element 4B.

In this test, the aluminum plate 5 had a dimension of 2.2 mm $\times$ 2.2 mm and was adhered to the other end of shim plate 3 by the epoxy resin 6 such that plate 5 can intercept the light beam 11 with a beam diameter 400 to 500 $\mu$m from the optical source 10 when a voltage is not applied to the bimorph type piezoelectric actuator 2 and can pass the light beam 11 when the voltage is applied thereto.

Mirror 9 is attached to a location close to the place where the one end shim plate 3 is attached to the brass base plate 1 so that the passed light beam can impinge onto the mirror 9 when the voltage is applied to the bimorph type piezoelectric actuator.

The optical detector 12 is located in a position such that it can detect the light beam reflected by mirror 9 when the voltage is applied to the bimorph type piezoelectric actuator.

When a DC voltage of 200 to 250 volts is applied to the above optical switch, the light beam 11 will pass the aluminum plate 5 and then the passed light beam is reflected by the mirror surface 9A of mirror 9 and is detected by the optical detector 12.

On the other hand, the light beam cannot pass the aluminum plate 5 when the DC voltage is not applied to the optical switch.

Figure 4:
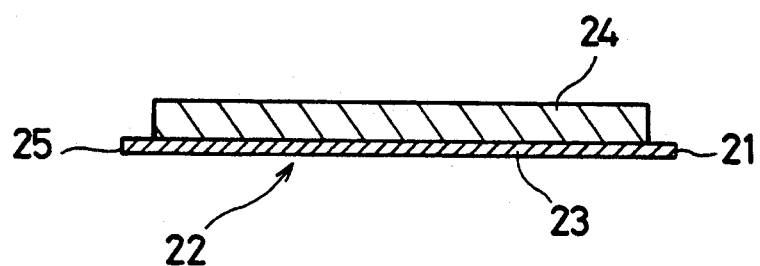
FIG. 4 is a partial schematic view of the invention illustrating another embodiment using a unimorph type piezoelectric actuator.

Referring now more particularly to FIG. 4, the invention is also applicable to a unimorph piezoelectric actuator for use in the optical switch. For this purpose, a unimorph type actuator 22 is used which comprises a shim plate 23 with a single piezoelectric plate 24 adhered to one side of shim plate 23. In this embodiment, one end 21 of shim plate 23 is connected with brass base plate 1 of FIG. 1 and the other end 25 is connected with aluminum plate 5 in FIG. 1. The other end 25 may also be connected to aluminum plate 5 by the epoxy as shown in FIGS. 2 and 3.

Figure 5:
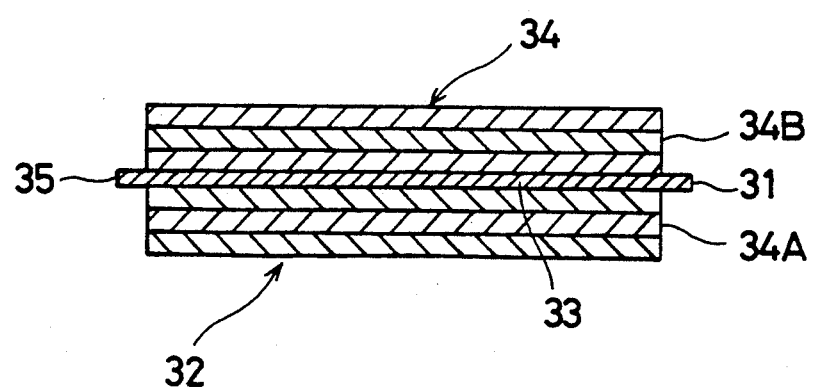
FIG. 5 is another embodiment of the invention using am multimorph piezoelectric multimorph actuator.

The third embodiment is shown in FIG. 5 and is applicable to a multimorph piezoelectric actuator 32 which comprises a shim plate 33 having one end 31 connected with brass bed plate as in FIG. 1 and the other end 35 connected with the aluminum plate 5.

The piezoelectric actuator 32 comprises plural piezoelectric plate 34 with one set of plural plates 34A positioned on one side of shim plate 33 and another set of plural plates 34B positioned on another side of shim plate 33.

The operation of the embodiments shown in FIGS. 4 and 5 are similar to that of FIGS. 1 to 3, and in one mode of the optical switch the aluminum plate optical shield 5 is in the FIG. 2 position, and in the other mode of the optical switch when energized, the aluminum plate optical shield 5 is in the FIG. 3 position to permit light beams to pass over optical shield 5.

While there has been shown what is considered to be the preferred embodiment of the invention, it will be obvious to those skilled in the art that various changes and modifications may be made therein without departing from the scope of the invention.

What is claimed is:

1. An optical switch comprising:
    a piezoelectric actuator including a shim plate and two piezoelectric elements sandwiching said shim plate therebetween;
    said shim plate including two edges, one of said two edges being attached to a base plate, for attaching said piezoelectric actuator to said base plate;
    an object for intercepting or passing over a light beam attached to the other edge of said two edges of said shim plate;
    a mirror for reflecting said light beam installed on a location close to the place where said piezoelectric actuator is attached to said base plate; and
    means for applying a voltage to said piezoelectric actuator.

2. The optical switch of claim 1, wherein said shim plate includes two faces and each of said piezoelectric elements is adjacent to one face of said two faces of said shim plate.

3. The optical switch of claim 2, wherein said object is attached to the other edge of said shim plate with an epoxy resin.

4. The optical switch of claim 2, further including an optical detector for receiving light transmitted from a laser source, passing said object and directed from said mirror.

5. The optical switch of claim 1, wherein said base plate is soldered to said one edge of said shim plate.

6. The optical switch of claim 5, further including an optical detector for receiving light transmitted from a laser source, passing said object and directed from said mirror.

7. The optical switch of claim 1, wherein said object is attached to the other edge of said shim plate with an epoxy resin.

8. The optical switch of claim 7, further including an optical detector for receiving light transmitted from a laser source, passing said object and directed from said mirror.

9. The optical switch of claim 1, further including an optical detector for receiving light transmitted from a laser source, passing said object and directed from said mirror.

10. An optical switch comprising:
    a piezoelectric actuator including a shim plate and a piezoelectric element, said shim plate including two edges and two faces, one of said faces being juxtaposed to said piezoelectric element and one of said two edges being connected with a base plate for attaching said piezoelectric actuator to said base plate;
    an object for intercepting or passing over a light beam attached to the other edge of said shim plate, said other edge of said shim plate being connected with said object for connecting thereto said piezoelectric actuator,
    a mirror for reflecting said light beam installed on a location close to the place where said piezoelectric actuator is attached to said base plate; and
    means for applying a voltage to said piezoelectric actuator.

11. The optical switch of claim 10, wherein said base plate is soldered to said one edge of said shim plate.

12. The optical switch of claim 11, wherein said object is attached to the other edge of said shim plate with an epoxy resin.

13. The optical switch of claim 11, further including an optical detector for receiving light transmitted from a laser source, passing said object and directed from said mirror.

14. The optical switch of claim 10, wherein said object is attached to the other edge of said shim plate with an epoxy resin.

15. The optical switch of claim 10, further including an optical detector for receiving light transmitted from a laser source, passing said object and directed from said mirror.

16. An optical switch comprising:
    a piezoelectric actuator including a shim plate and a pair of plural piezoelectric plates sandwiching said shim plate therebetween;
    said shim plate including two edges, one of said edges being attached to said base plate for attaching said piezoelectric actuator to said base plate;
    an object for intercepting or passing over a light beam attached to the other edge of said shim plate;
    a mirror for reflecting said light beam installed on a location close to the place where said piezoelectric actuator is attached to said base plate; and
    means for applying a voltage to said piezoelectric actuator.

17. The optical switch of claim 16, wherein said shim plate includes two faces, one of said pair of plural piezoelectric plates being adjacent to one face of said two faces and the other of said pair of plural piezoelectric plates being adjacent to the other of said two faces.

18. The optical switch of claim 16, wherein said base plate is soldered to said one edge of said shim plate.

19. The optical switch of claim 16, wherein said object is attached to the other edge of said shim plate with an epoxy resin.

20. The optical switch of claim 16, further including an optical detector for receiving light transmitted from a laser source, passing said object and directed from said mirror.

* * * * *